US009854554B2

(12) United States Patent
Liao et al.

(10) Patent No.: US 9,854,554 B2
(45) Date of Patent: Dec. 26, 2017

(54) IP ADDRESS ASSIGNMENT APPARATUS, SYSTEM, AND METHOD

(71) Applicant: HUAWEI TECHNOLOGIES CO., LTD., Shenzhen (CN)

(72) Inventors: Min Liao, Beijing (CN); Yanfang Lv, Beijing (CN); Wenlin Ye, Shanghai (CN); Sirui Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/280,031

(22) Filed: Sep. 29, 2016

(65) Prior Publication Data

US 2017/0019874 A1 Jan. 19, 2017

Related U.S. Application Data

(63) Continuation of application No. PCT/CN2014/074771, filed on Apr. 3, 2014.

(51) Int. Cl.
*H04W 24/00* (2009.01)
*H04W 64/00* (2009.01)
(Continued)

(52) U.S. Cl.
CPC ......... *H04W 64/00* (2013.01); *H04L 61/2007* (2013.01); *H04L 61/2061* (2013.01);
(Continued)

(58) Field of Classification Search
CPC ... H04W 64/00; H04W 76/02; H04W 76/064; H04W 4/02; H04W 36/0011; H04W 88/02; H04L 61/2061; H04L 61/2007
See application file for complete search history.

(56) References Cited

U.S. PATENT DOCUMENTS 6,473,411 B1 * 10/2002 Kumaki .................. H04L 29/06
370/331
2004/0194106 A1 * 9/2004 Ogawa .............. H04L 29/12066
718/100
(Continued)

FOREIGN PATENT DOCUMENTS

CN 101001442 7/2007
CN 101621785 1/2010
(Continued)

OTHER PUBLICATIONS

International Search Report dated Jan. 7, 2015 in corresponding International Application No. PCT/CN2014/074771.
(Continued)

*Primary Examiner* — Ajit Patel
(74) *Attorney, Agent, or Firm* — Staas & Halsey LLP

(57) ABSTRACT

The present invention provides an IP address assignment apparatus and method. A packet data gateway receives a connection establishment request that is sent by a mobility management network element and that carries user location information, assigns an IP address to the terminal according to a correspondence between the user location information and an IP address pool, and feeds back the IP address to the mobility management network element. In the present invention, effects that the packet data gateway can assign an IP address according to a location of a terminal, and different IP addresses are assigned at different regions are achieved.

10 Claims, 12 Drawing Sheets

(51) Int. Cl.
| | |
|---|---|
| *H04L 29/12* | (2006.01) |
| *H04W 4/02* | (2009.01) |
| *H04W 76/02* | (2009.01) |
| *H04W 76/06* | (2009.01) |
| *H04W 88/02* | (2009.01) |
| *H04W 36/00* | (2009.01) |

(52) U.S. Cl.
CPC .............. *H04W 4/02* (2013.01); *H04W 76/02* (2013.01); *H04W 76/064* (2013.01); *H04W 36/0011* (2013.01); *H04W 88/02* (2013.01)

(56) References Cited

U.S. PATENT DOCUMENTS

| | | | |
|---|---|---|---|
| 2005/0201357 A1* | 9/2005 | Poyhonen | H04L 12/66 370/352 |
| 2007/0055874 A1* | 3/2007 | Phan-Anh | H04L 63/0815 713/168 |
| 2007/0180142 A1* | 8/2007 | Small | H04L 12/14 709/245 |
| 2009/0034536 A1* | 2/2009 | Morand | H04L 61/2015 370/400 |
| 2009/0092045 A1* | 4/2009 | Wu | H04W 60/06 370/230 |
| 2011/0002261 A1* | 1/2011 | Mocanu | H04W 8/26 370/328 |
| 2011/0090868 A1 | 4/2011 | Zhang et al. | |
| 2012/0042058 A1 | 2/2012 | Shaikh et al. | |
| 2012/0311184 A1* | 12/2012 | Yamada | H04L 61/2038 709/245 |
| 2013/0034057 A1* | 2/2013 | Aramoto | H04W 36/0011 370/328 |
| 2014/0344477 A1 | 11/2014 | Shigeeda | |

FOREIGN PATENT DOCUMENTS

| | | | |
|---|---|---|---|
| CN | 103701950 | * | 4/2014 |
| WO | WO2013105219 | | 7/2013 |

OTHER PUBLICATIONS

International Search Report, dated Jan. 7, 2015, in International Application No. PCT/CN2014/074771 (4 pp.).
Written Opinion of the International Searching Authority, dated Jan. 7, 2015, in International Application No. PCT/CN2014/074771 (9 pp.).
Extended European Search Report, dated Mar. 3, 2017, in European Application No. 14887940.6 (8 pp.).
Waters, G., *The IPv4 Subnet Selection Option for DHCP*, Network Working Group, Nortel Networks, Nov. 2000 (8 pp.).
*3rd Generation Partnership Project; Technical Specification Group Services and System Aspects; General Packet Radio Service (GPRS); Service description; Stage 2 (Release 12)*, 3GPP TS 23.060 V12.4.0 (Mar. 2014), pp. 1-345.
*3rd Generation Partnership Project; Technical Specification Group Services and System Aspects; General Packet Radio Service (GPRS) enhancements for Evolved Universal Terrestrial Radio Access Network (E-UTRAN) access (Release 12)*, 3GPP TS 23.401 V12.4.0 (Mar. 2014), pp. 1-302.
*3rd Generation Partnership Project; Technical Specification Group Radio Access Network; UTRAN Iu interface Radio Access Network Application Part (RANAP) signaling (Release 12)*, 3GPP TS 25.413 V12.1.0 (Mar. 2014), pp. 1-443.
*3rd Generation Partnership Project; Technical Specification Group Core Network and Terminals; General Packet Radio Service (GPRS); GPRS Tunnelling Protocol (GTP) across the Gn and Gp interface (Release 12)*, 3GPP TS 29.060 V12.4.0 (Mar. 2014), pp. 1-180.
*3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)*, 3GPP TS 29.274 V12.4.0 (Mar. 2014), pp. 1-245.
*3rd Generation Partnership Project; Technical Specification Group Radio Access Network; Evolved Universal Terrestrial Radio Access Network (E-UTRAN); S1 Application Protocol (S1AP) (Release 12)*, 3GPP TS 36.413 V12.1.0 (Mar. 2014), pp. 1-285.

* cited by examiner

IP ADDRESS ASSIGNMENT APPARATUS, SYSTEM, AND METHOD

CROSS-REFERENCE TO RELATED APPLICATIONS

This application is a continuation of International Application No. PCT/CN2014/074771, filed on Apr. 3, 2014, the disclosure of which is hereby incorporated by reference in its entirety.

TECHNICAL FIELD

The present invention relates to the communications field, and in particular, to an IP address assignment apparatus, system, and method.

BACKGROUND

A packet switched network is an important constituent part in a mobile communications system, and is used to provide a mobile Internet service to users, so that the users can use services, such as audio and video transmission, emailing, and net surfing, by using the mobile Internet.

A 3GPP (3rd Generation Partnership Project) network is used as an example, and a process in which UE (User Equipment) uses the mobile Internet is as follows: The UE initiates an attach request to an SGSN (Serving GPRS Support Node)/MME (Mobility Management Entity); after receiving the attach request, the SGSN/MME sends a PDN (Packet Data Network) activation request to a GGSN (Gateway GPRS Support Node)/P-GW (PDN Gateway); after receiving the PDN activation request, the GGSN/P-GW randomly assigns the UE one IP address from an address pool; the UE establishes a PDN connection to the GGSN/P-GW by using the IP address, and accesses the network by means of the PDN connection.

During implementation of the present invention, the inventor finds that the foregoing technology has at least the following problem: The GGSN/P-GW randomly assigns an IP address to the UE, and an Internet operator cannot identify another characteristic of the UE according to the IP address of the UE, and cannot further provide a differentiated service.

SUMMARY

To resolve a problem that when an IP address is randomly assigned to UE, an Internet operator cannot identify another characteristic of the UE according to the IP address of the UE, embodiments of the present invention provide an IP address assignment apparatus, system, and method. The technical solutions are as follows:

According to a first aspect of the present invention, an IP address assignment apparatus is provided, where the apparatus is used in a mobility management network element, and includes:

a request receiving module, configured to receive a connection establishment request of a terminal, where the connection establishment request carries user location information of the terminal;

a request sending module, configured to send the connection establishment request to a packet data gateway;

an address receiving module, configured to receive an IP address of the terminal that is fed back by the packet data gateway, where the IP address is assigned by the packet data gateway to the terminal according to a correspondence between the user location information and an IP address pool; and an address sending module, configured to send the IP address to the terminal.

In a first possible implementation manner of the first aspect, the packet data gateway learns a corresponding IP area according to the user location information, and the IP address is obtained from an IP address pool corresponding to the IP area.

With reference to the first aspect, in a second possible implementation manner, the apparatus further includes:

a first release module, configured to: if the terminal leaves a current location area and enters a target location area, determine, according to a location area change of the terminal, whether to send a release request to the terminal.

With reference to the second possible implementation manner of the first aspect, in a third possible implementation manner, the first release module includes:

a first release unit, a second release unit, or a third release unit, where the first release unit is configured to send the release request to the terminal if the current location area and the target location area are both managed by the mobility management network element, and the target location area does not correspond to any IP area;

the second release unit is configured to send the release request to the terminal if the current location area and the target location area are both managed by the mobility management network element, and the target location area belongs to another IP area; or the third release unit is configured to skip sending the release request to the terminal if the current location area and the target location area are both managed by the mobility management network element, and the current location area and the target location area belong to a same IP area, where each IP area corresponds to one or more than one IP address pool.

With reference to the first aspect, in a fourth possible implementation manner, the apparatus further includes:

a second release module, configured to send the release request to the terminal if the terminal leaves a current location area and enters a target location area, and the current location area and the target location area in which the terminal is located after movement are managed by different mobility management network elements.

With reference to the first aspect, in a fifth possible implementation manner, the apparatus further includes:

an entry detection module, configured to detect that a current location area of the terminal is managed by the mobility management network element and is a location area belonging to one IP area; and a third release module, configured to send a release request to the terminal.

According to a second aspect of the present invention, an IP address assignment apparatus is provided, where the apparatus is used in a packet data gateway, and includes:

a request receiving module, configured to receive a connection establishment request that is sent by a mobility management network element and that carries user location information, where the connection establishment request is sent after the mobility management network element receives a connection establishment request of a terminal;

an address assignment module, configured to assign an IP address to the terminal according to a correspondence between the user location information and an IP address pool; and an address feedback module, configured to feed back the IP address of the terminal to the mobility management network element.

In a first possible implementation manner of the second aspect, the address assignment module includes:

a location reading unit, a first assignment unit, and a second assignment unit, where the location reading unit is configured to read a location area of the terminal from the user location information;

the first assignment unit is configured to: if the correspondence includes a correspondence between a location area and an IP area, query the correspondence for the corresponding IP area according to the location area, and assign the terminal one IP address from an IP address pool of the found IP area; and the second assignment unit is configured to: if the correspondence includes a first correspondence between a location area and intermediate information and a second correspondence between intermediate information and an IP area, query the first correspondence for the corresponding intermediate information according to the location area, then query the second correspondence for a corresponding IP area according to the found intermediate information, and assign the terminal one IP address from an IP address pool of the found IP area, where the intermediate information is an access point name APN, a domain Domain, or a network access identifier NAI.

According to a third aspect of the present invention, a mobility management network element is provided, where the network element includes: a processor, and a memory, a receiver, and a transmitter that are electrically connected to the processor, where the receiver is configured to receive a connection establishment request of a terminal, where the connection establishment request carries user location information of the terminal;

the processor is configured to control the transmitter to send the connection establishment request to a packet data gateway;

the receiver is configured to receive an IP address of the terminal that is fed back by the packet data gateway, where the IP address is assigned by the packet data gateway to the terminal according to a correspondence between the user location information and an IP address pool; and the processor is further configured to control the transmitter to send the IP address to the terminal.

In a first possible implementation manner of the third aspect, the packet data gateway learns a corresponding IP area according to the user location information, and the IP address is obtained from an IP address pool corresponding to the IP area.

With reference to the third aspect, in a second possible implementation manner, the processor is further configured to: if the terminal leaves a current location area and enters a target location area, determine, according to a location area change of the terminal, whether to control the transmitter to send a release request to the terminal.

With reference to the second possible implementation manner of the third aspect, in a third possible implementation manner, the processor is further configured to: if the current location area and the target location area are both managed by the mobility management network element, and the target location area does not correspond to any IP area, control the transmitter to send the release request to the terminal;

the processor is further configured to: if the current location area and the target location area are both managed by the mobility management network element, and the target location area belongs to another IP area, control the transmitter to send the release request to the terminal; or the processor is further configured to skip sending the release request to the terminal if the current location area and the target location area are both managed by the mobility management network element, and the current location area and the target location area belong to a same IP area, where each IP area corresponds to one or more than one IP address pool.

With reference to the third aspect, in a fourth possible implementation manner, the processor is further configured to: if the terminal leaves a current location area and enters a target location area, and the current location area and the target location area in which the terminal is located after movement are managed by different mobility management network elements, control the transmitter to send the release request to the terminal.

With reference to the third aspect, in a fifth possible implementation manner, the processor is further configured to detect that a current location area of the terminal is managed by the mobility management network element and is a location area belonging to one IP area; and the processor is further configured to control the transmitter to send a release request to the terminal.

According to a fourth aspect of the present invention, a packet data gateway is provided, where the gateway includes: a processor, and a memory, a receiver, and a transmitter that are electrically connected to the processor, where the receiver is configured to receive a connection establishment request that is sent by a mobility management network element and that carries user location information, where the connection establishment request is sent after the mobility management network element receives a connection establishment request of a terminal;

the processor is configured to assign an IP address to the terminal according to a correspondence between the user location information and an IP address pool; and the processor is further configured to control the transmitter to feed back the IP address of the terminal to the mobility management network element.

In a first possible implementation manner of the fourth aspect, the processor is further configured to read a location area of the terminal from the user location information;

the processor is further configured to: if the correspondence includes a correspondence between a location area and an IP area, query the correspondence for the corresponding IP area according to the location area, and assign the terminal one IP address from an IP address pool of the found IP area; and the processor is further configured to: if the correspondence includes a first correspondence between a location area and intermediate information and a second correspondence between intermediate information and an IP area, query the first correspondence for the corresponding intermediate information according to the location area, then query the second correspondence for a corresponding IP area according to the found intermediate information, and assign the terminal one IP address from an IP address pool of the found IP area, where the intermediate information is an access point name APN, a domain Domain, or a network access identifier NAI.

According to a fifth aspect of the present invention, an IP address assignment system is provided, where the system includes: a mobility management network element and a packet data gateway, where the mobility management network element is connected to the packet data gateway by means of a wired network;

the mobility management network element includes the IP address assignment apparatus according to the first aspect or any one of the possible implementation manners of the first aspect; and the packet data gateway includes the IP address assignment apparatus according to the second aspect or any one of the possible implementation manners of the second aspect.

According to a sixth aspect of the present invention, an IP address assignment system is provided, where the system includes: a mobility management network element and a packet data gateway, where the mobility management network element is connected to the packet data gateway by means of a wired network;

the mobility management network element includes the mobility management network element according to the third aspect or any one of the possible implementation manners of the third aspect; and the packet data gateway includes the packet data gateway according to the fourth aspect or any one of the possible implementation manners of the fourth aspect.

According to a fifth aspect of the present invention, an IP address assignment method is provided, where the method is used in a mobility management network element, and includes:

receiving a connection establishment request of a terminal, where the connection establishment request carries user location information of the terminal;

sending the connection establishment request to a packet data gateway;

receiving an IP address of the terminal that is fed back by the packet data gateway, where the IP address is assigned by the packet data gateway to the terminal according to a correspondence between the user location information and an IP address pool; and sending the IP address to the terminal.

In a first possible implementation manner of the fifth aspect, that the IP address is assigned by the packet data gateway to the terminal according to a correspondence between the user location information and an IP address pool includes:

the packet data gateway learns a corresponding IP area according to the user location information, and the IP address is obtained from an IP address pool corresponding to the IP area.

In a second possible implementation manner of the fifth aspect, after the sending the IP address to the terminal, the method further includes:

if the terminal leaves a current location area and enters a target location area, determining, according to a location area change of the terminal, whether to send a release request to the terminal.

With reference to the second possible implementation manner of the fifth aspect, in a third possible implementation manner, the determining, according to a location area change of the terminal and the correspondence, whether to send a release request to the terminal includes:

sending the release request to the terminal if the current location area and the target location area are both managed by the mobility management network element, and the target location area does not correspond to any IP area;

or sending the release request to the terminal if the current location area and the target location area are both managed by the mobility management network element, and the target location area belongs to another IP area;

or skipping sending the release request to the terminal if the current location area and the target location area are both managed by the mobility management network element, and the current location area and the target location area belong to a same IP area, where each IP area corresponds to one or more than one IP address pool.

In a fourth possible implementation manner of the fifth aspect, after the sending the IP address to the terminal, the method further includes:

sending the release request to the terminal if the terminal leaves a current location area and enters a target location area, and the current location area and the target location area in which the terminal is located after movement are managed by different mobility management network elements.

In a sixth possible implementation manner of the fifth aspect, before the receiving a connection establishment request of a terminal, the method further includes:

detecting that a current location area of the terminal is managed by the mobility management network element and is a location area belonging to one IP area; and sending a release request to the terminal.

According to a sixth aspect of the present invention, an IP address assignment method is provided, where the method is used in a packet data gateway, and includes:

receiving a connection establishment request that is sent by a mobility management network element and that carries user location information, where the connection establishment request is sent after the mobility management network element receives a connection establishment request of a terminal;

assigning an IP address to the terminal according to a correspondence between the user location information and an IP address pool; and feeding back the IP address of the terminal to the mobility management network element.

In a first possible implementation manner of the sixth aspect, the assigning an IP address to the terminal according to a correspondence between the user location information and an IP address pool includes:

reading a location area of the terminal from the user location information;

if the correspondence includes a correspondence between a location area and an IP area, querying the correspondence for the corresponding IP area according to the location area, and assigning the terminal one IP address from an IP address pool of the found IP area; and if the correspondence includes a first correspondence between a location area and intermediate information and a second correspondence between intermediate information and an IP area, querying the first correspondence for the corresponding intermediate information according to the location area, then querying the second correspondence for a corresponding IP area according to the found intermediate information, and assigning the terminal one IP address from an IP address pool of the found IP area, where the intermediate information is an access point name APN, a domain Domain, or a network access identifier NAI.

The technical solutions provided in the embodiments of the present invention have the following beneficial effects:

A mobility management network element receives a connection establishment request of a terminal, and sends the connection establishment request to a packet data gateway, and the packet data gateway assigns an IP address to the terminal according to a correspondence between user location information carried in the connection establishment request and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
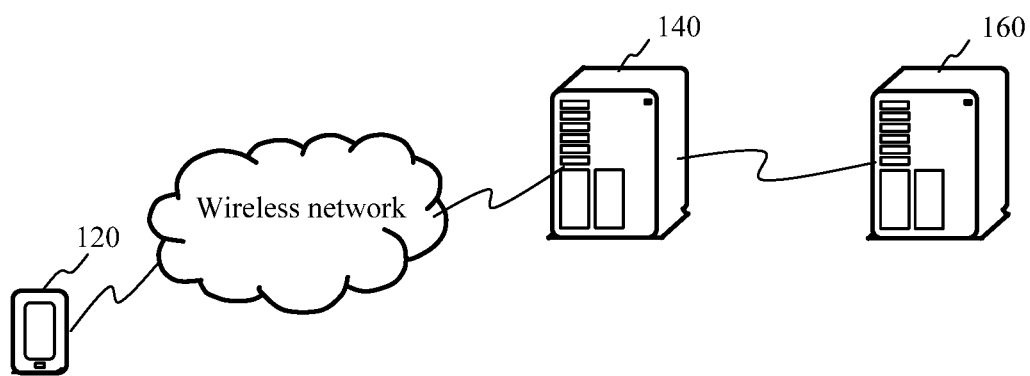
FIG. 1 is a schematic structural diagram of an IP address assignment system according to an embodiment of the present invention.

Refer to FIG. 1, which is a schematic structural diagram of an IP address assignment system according to an embodiment of the present invention. The IP address assignment system may be different mobile communications systems, and the system includes a terminal 120, a mobility management network element 140, and a packet data gateway 160.

The terminal 120 is a mobile communications device held by a user. The terminal 120 is connected to the mobility management network element 140 by means of a wireless network. Generally, an access network element (not shown in the figure) is further disposed between the terminal 120 and the mobility management network element 140. The terminal 120 is connected to the access network element by means of the wireless network, and the access network element is connected to the mobility management network element 140 by means of a wired network.

The mobility management network element 140 is configured to manage a location area update procedure and signaling transport in a packet data connection of the terminal 120.

The packet data gateway 160 is configured to assign an IP address to the terminal 120, and establish a packet data connection to the terminal 120 according to the assigned IP address.

Figure 2:
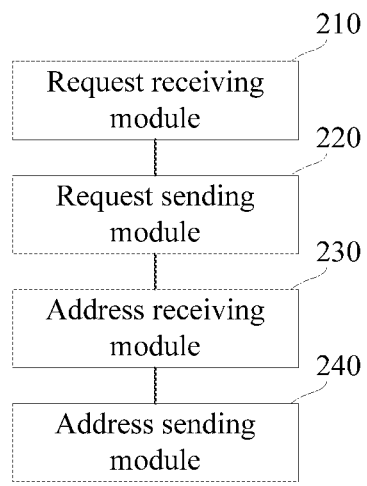
FIG. 2 is a schematic structural diagram of an IP address assignment apparatus according to an embodiment of the present invention.

Refer to FIG. 2, which is a structural block diagram of an IP address assignment apparatus according to an embodiment of the present invention. The IP address assignment apparatus may be implemented as all or a portion of the mobility management network element in FIG. 1 by means of software, hardware, or a combination thereof, and the apparatus includes: a request receiving module 210, a request sending module 220, an address receiving module 230, and an address sending module 240.

The request receiving module 210 is configured to receive a connection establishment request of a terminal, where the connection establishment request carries user location information of the terminal.

The request sending module 220 is configured to send the connection establishment request to a packet data gateway.

The address receiving module 230 is configured to receive an IP address of the terminal that is fed back by the packet data gateway, where the IP address is assigned by the packet data gateway to the terminal according to a correspondence between the user location information and an IP address pool.

The address sending module 240 is configured to send the IP address to the terminal.

To sum up, according to the IP address assignment apparatus provided in this embodiment, a mobility management network element receives a connection establishment request of a terminal, and sends the connection establishment request to a packet data gateway, and the packet data gateway assigns an IP address to the terminal according to user location information in the connection establishment request and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

Figure 3:
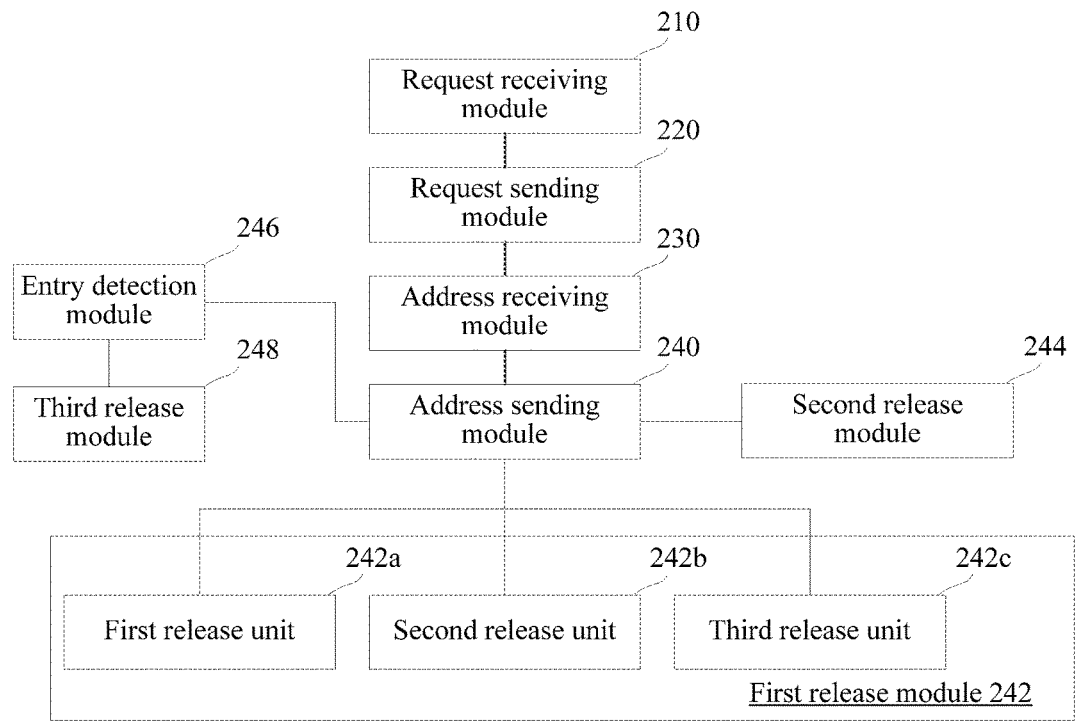
FIG. 3 is a schematic structural diagram of an IP address assignment apparatus according to another embodiment of the present invention.

Refer to FIG. 3, which is a structural block diagram of an IP address assignment apparatus according to another embodiment of the present invention. The IP address assignment apparatus may be implemented as all or a portion of the mobility management network element in FIG. 1 by means of software, hardware, or a combination thereof, and the apparatus includes: a request receiving module 210, a request sending module 220, an address receiving module 230, and an address sending module 240.

The request receiving module 210 is configured to receive a connection establishment request of a terminal, where the connection establishment request carries user location information of the terminal.

The request sending module 220 is configured to send the connection establishment request to a packet data gateway.

The address receiving module 230 is configured to receive an IP address of the terminal that is fed back by the packet data gateway, where the IP address is assigned by the packet data gateway to the terminal according to a correspondence between the user location information and an IP address pool.

The packet data gateway learns a corresponding IP area according to the user location information, and the IP address is obtained from an IP address pool corresponding to the IP area.

The address sending module 240 is configured to send the IP address to the terminal.

The apparatus further includes: a first release module 242, where the first release module 242 is configured to: if the terminal leaves a current location area and enters a target location area, determine, according to a location area change of the terminal, whether to send a release request to the terminal.

The first release module 242 includes: a first release unit 242a, a second release unit 242b, or a third release unit 242c.

The first release unit 242a is configured to send the release request to the terminal if the current location area and the target location area are both managed by the mobility management network element, and the target location area does not correspond to any IP area.

The second release unit 242b is configured to send the release request to the terminal if the current location area and the target location area are both managed by the mobility management network element, and the target location area belongs to another IP area.

The third release unit 242c is configured to skip sending the release request to the terminal if the current location area and the target location area are both managed by the mobility management network element, and the current location area and the target location area belong to a same IP area.

Each IP area corresponds to one or more than one IP address pool.

The apparatus further includes: a second release module 244.

The second release module 244 is configured to send a release request to the terminal if the terminal leaves a current location area and enters a target location area, and the current location area and the target location area in which the terminal is located after movement are managed by different mobility management network elements.

The apparatus further includes: an entry detection module 246 and a third release module 248.

The entry detection module 246 is configured to detect that a current location area of the terminal is managed by the mobility management network element and is a location area belonging to one IP area.

The third release module 248 is configured to send a release request to the terminal.

To sum up, according to the IP address assignment apparatus provided in this embodiment, a mobility management network element receives a connection establishment request of a terminal, and sends the connection establishment request to a packet data gateway, and the packet data gateway assigns an IP address to the terminal according to user location information in the connection establishment request and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

After detecting that the terminal leaves or enters a current location area, the IP address assignment apparatus provided in this embodiment further sends a release request to the terminal selectively, which ensures an effect that the terminal uses different IP addresses in different IP areas.

Figure 4:
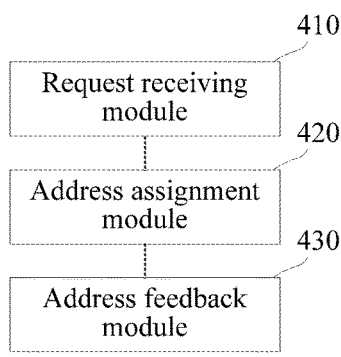
FIG. 4 is a schematic structural diagram of an IP address assignment apparatus according to an embodiment of the present invention.

Refer to FIG. 4, which is a structural block diagram of an IP address assignment apparatus according to an embodiment of the present invention. The IP address assignment apparatus may be implemented as all or a portion of the packet data gateway shown in FIG. 1 by means of software, hardware, or a combination thereof, and the IP address assignment apparatus includes: a request receiving module 410, an address assignment module 420, and an address feedback module 430.

The request receiving module 410 is configured to receive a connection establishment request that is sent by a mobility management network element and that carries user location information, where the connection establishment request is sent after the mobility management network element receives a connection establishment request of a terminal.

The address assignment module 420 is configured to assign an IP address to the terminal according to a correspondence between the user location information and an IP address pool.

The address feedback module 430 is configured to feed back the IP address to the mobility management network element.

To sum up, the IP address assignment apparatus provided in this embodiment receives a connection establishment request that is sent by a mobility management network element and that carries user location information; and assigns an IP address to a terminal according to a correspondence between the user location information and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

Figure 5:
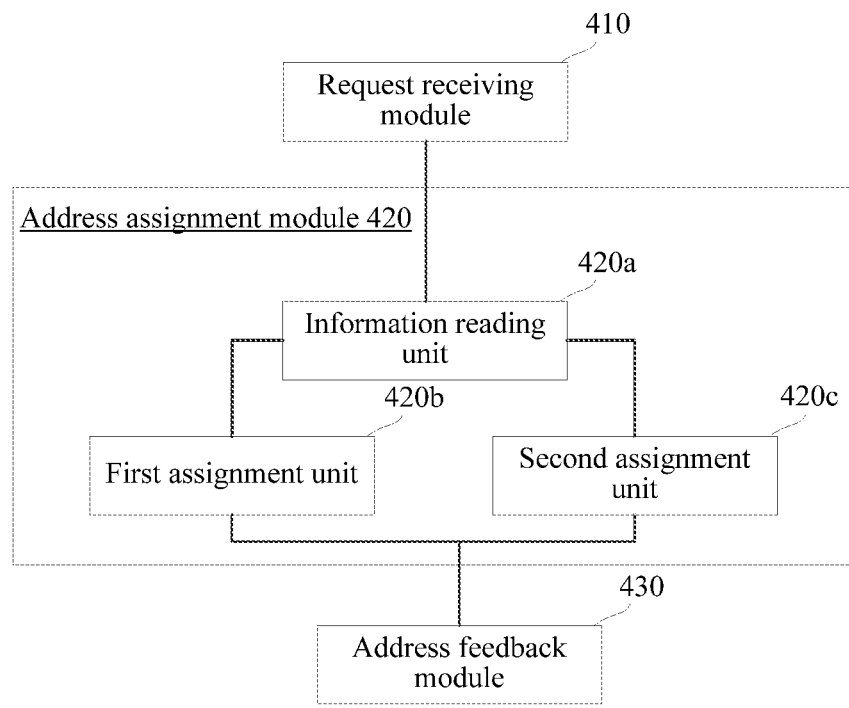
FIG. 5 is a schematic structural diagram of an IP address assignment apparatus according to another embodiment of the present invention.

Refer to FIG. 5, which is a structural block diagram of an IP address assignment apparatus according to another embodiment of the present invention. The IP address assignment apparatus may be implemented as all or a portion of the packet data gateway shown in FIG. 1 by means of software, hardware, or a combination thereof, and the IP address assignment apparatus includes: a request receiving module 410, an address assignment module 420, and an address feedback module 430.

The request receiving module 410 is configured to receive a connection establishment request that is sent by a mobility management network element and that carries user location information, where the connection establishment request is sent after the mobility management network element receives a connection establishment request of a terminal.

The address assignment module 420 is configured to assign an IP address to the terminal according to a correspondence between the user location information and an IP address pool.

The address assignment module 420 includes: a location reading unit 420a, a first assignment unit 420b, and a second assignment unit 420c.

The location reading unit 420a is configured to read a location area of the terminal from the user location information.

The first assignment unit 420b is configured to: if the correspondence includes a correspondence between a location area and an IP area, query the correspondence for the corresponding IP area according to the location area, and assign the terminal one IP address from an IP address pool of the found IP area.

The second assignment unit 420c is configured to: if the correspondence includes a first correspondence between a location area and intermediate information and a second correspondence between intermediate information and an IP area, query the first correspondence for the corresponding intermediate information according to the location area, then query the second correspondence for a corresponding IP area according to the found intermediate information, and assign the terminal one IP address from an IP address pool of the found IP area, where the intermediate information is an APN (Access Point Name), a Domain, or an NAI (Network Access Identifier).

The address feedback module 430 is configured to feed back the IP address to the mobility management network element.

To sum up, the IP address assignment apparatus provided in this embodiment receives a connection establishment request that is sent by a mobility management network element and that carries user location information; and assigns an IP address to a terminal according to a correspondence between the user location information and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

The IP address assignment apparatus provided in this embodiment further uses two different correspondences, a correspondence can be set more flexibly, and a correspondence between an IP area and a location area can be set more subtly according to different APNs, Domains, or NAIs, achieving an effect of wider applicability of this embodiment.

Figure 6:
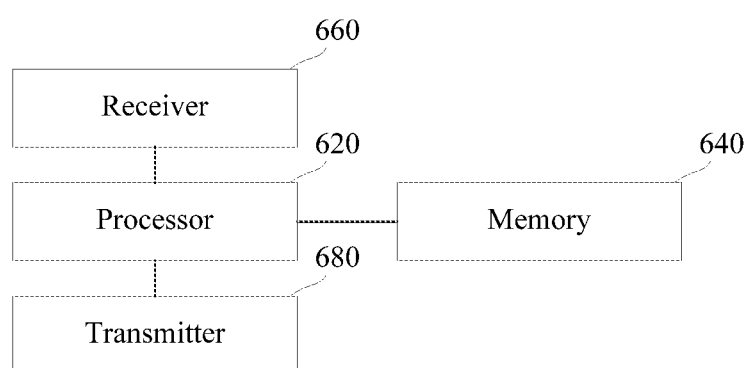
FIG. 6 is a schematic structural diagram of a mobility management network element according to an embodiment of the present invention.

Refer to FIG. 6, which is a structural block diagram of a mobility management network element according to an embodiment of the present invention. The network element includes: a processor 620, and a memory 640, a receiver 660, and a transmitter 680 that are electrically connected to the processor.

The receiver 660 is configured to receive a connection establishment request of a terminal, where the connection establishment request carries user location information of the terminal.

The processor 620 is configured to control the transmitter 680 to send the connection establishment request to a packet data gateway.

The receiver 660 is configured to receive an IP address of the terminal that is fed back by the packet data gateway, where the IP address is assigned by the packet data gateway to the terminal according to a correspondence between the user location information and an IP address pool.

The processor 620 is further configured to control the transmitter 680 to send the IP address to the terminal.

To sum up, according to the mobility management network element provided in this embodiment, the mobility management network element receives a connection establishment request of a terminal, and sends the connection establishment request to a packet data gateway, and the packet data gateway assigns an IP address to the terminal according to user location information in the connection establishment request and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

In a first possible implementation manner of the embodiment shown in FIG. 6, the packet data gateway learns a corresponding IP area according to the user location information, and the IP address is obtained from an IP address pool corresponding to the IP area.

With reference to the embodiment shown in FIG. 6, in a second possible implementation manner, the processor 620 is further configured to: if the terminal leaves a current location area and enters a target location area, determine, according to a location area change of the terminal, whether to control the transmitter 680 to send a release request to the terminal.

With reference to the second possible implementation manner of the embodiment shown in FIG. 6, in a third possible implementation manner, the processor 620 is further configured to: if the current location area and the target location area are both managed by the mobility management network element, and the target location area does not correspond to any IP area, control the transmitter 680 to send the release request to the terminal;

the processor 620 is further configured to: if the current location area and the target location area are both managed by the mobility management network element, and the target location area belongs to another IP area, control the transmitter 680 to send the release request to the terminal; or the processor 620 is further configured to skip sending the release request to the terminal if the current location area and the target location area are both managed by the mobility management network element, and the current location area and the target location area belong to a same IP area, where each IP area corresponds to one or more than one IP address pool.

With reference to the embodiment shown in FIG. 6, in a fourth possible implementation manner, the processor 620 is further configured to: if the terminal leaves a current location area and enters a target location area, and the current location area and the target location area in which the terminal is located after movement are managed by different mobility management network elements, control the transmitter 680 to send a release request to the terminal.

With reference to the embodiment shown in FIG. 6, in a fifth possible implementation manner, the processor 620 is further configured to detect that a current location area of the terminal is managed by the mobility management network element and is a location area belonging to one IP area; and the processor 620 is further configured to control the transmitter 680 to send a release request to the terminal.

Figure 7:
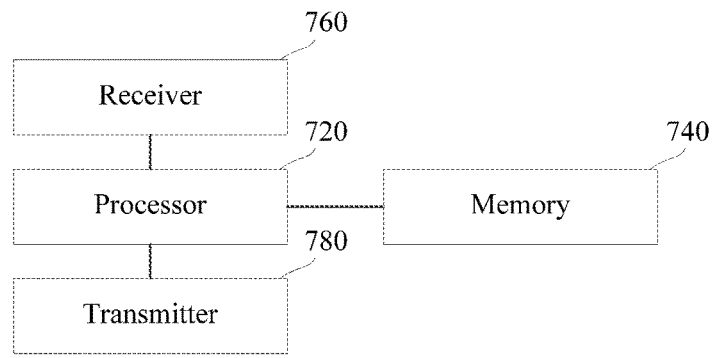
FIG. 7 is a schematic structural diagram of a packet data gateway according to an embodiment of the present invention.

Refer to FIG. 7, which is a schematic structural diagram of a packet data gateway according to an embodiment of the present invention. The gateway includes: a processor 720, and a memory 740, a receiver 760, and a transmitter 780 that are electrically connected to the processor.

The receiver 760 is configured to receive a connection establishment request that is sent by a mobility management network element and that carries user location information, where the connection establishment request is sent after the mobility management network element receives a connection establishment request of a terminal.

The processor 720 is configured to assign an IP address to the terminal according to a correspondence, which is stored in the memory 740, between the user location information and an IP address pool.

The processor 720 is further configured to control the transmitter 780 to feed back the IP address to the mobility management network element.

To sum up, the packet data gateway provided in this embodiment receives a connection establishment request that is sent by a mobility management network element and that carries user location information; and assigns an IP address to a terminal according to a correspondence between the user location information and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

In a first possible implementation manner of the embodiment in FIG. 7, the processor 720 is further configured to read a location area of the terminal from the user location information;

the processor 720 is further configured to: if the correspondence includes a correspondence between a location area and an IP area, query the correspondence for the corresponding IP area according to the location area, and assign the terminal one IP address from an IP address pool of the found IP area; and the processor 720 is further configured to: if the correspondence includes a first correspondence between a location area and intermediate information and a second correspondence between intermediate information and an IP area, query the first correspondence for the corresponding intermediate information according to the location area, then query the second correspondence for a corresponding IP area according to the found intermediate information, and assign the terminal one IP address from an IP address pool of the found IP area, where the intermediate information is an APN, a Domain, or an NAI.

Figure 8:
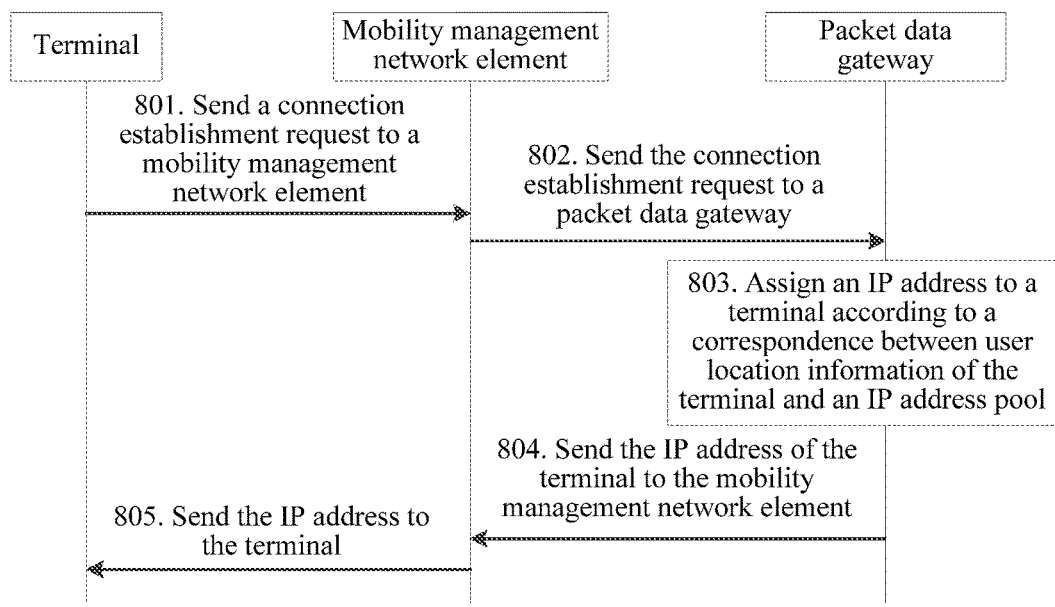
FIG. 8 is a method flowchart of an IP address assignment method according to an embodiment of the present invention.

Refer to FIG. 8, which is a method flowchart of an IP address assignment method according to an embodiment of the present invention. The method includes:

Step 801: A terminal sends a connection establishment request to a mobility management network element.

Correspondingly, the mobility management network element receives the connection establishment request of the terminal, where the connection establishment request carries user location information of the terminal.

Step 802: The mobility management network element sends the connection establishment request to a packet data gateway.

Correspondingly, the packet data gateway receives the connection establishment request.

Step 803: The packet data gateway assigns an IP address to the terminal according to a correspondence between user location information and an IP address pool.

The correspondence between user location information and an IP address pool includes:

a correspondence between a location area and an IP address pool, where each IP address pool corresponds to at least one location area and each IP address pool corresponds to one IP area.

Step 804: The packet data gateway sends the IP address of the terminal to the mobility management network element.

Correspondingly, the mobility management network element receives the IP address, which is sent by the packet data gateway, of the terminal.

Step 805: The mobility management network element sends the IP address to the terminal.

Correspondingly, the terminal receives the IP address sent by the mobility management network element, where the IP address is used to establish a packet data connection between the terminal and the packet data gateway.

To sum up, according to the IP address assignment method provided in this embodiment, a mobility management network element receives a connection establishment request of a terminal, and sends the connection establishment request to a packet data gateway, and the packet data gateway assigns an IP address to the terminal according to user location information in the connection establishment request and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

Briefly, in this embodiment of the present invention, pre-division needs to be performed to obtain IP areas, each IP area corresponds to one or more than one IP address pool, and IP address pools corresponding to different IP areas may have no intersection set.

Then, each IP area includes at least one location area, and one location area can belong to only one IP area. However, one IP area may include more than one location area. The "location area" described in this embodiment of the present invention is a general concept, and represents an area in which a terminal may randomly move and does not need to update a location. In different communications systems, the location area may be specifically represented by using a TAC (Tracking Area Code), a LAC (Location Area Code), a SAC (Service Area Code), a RAC (Routing Area Code), a BSID (Base Station Identity Code), a Subnet, and the like.

Figure 9:
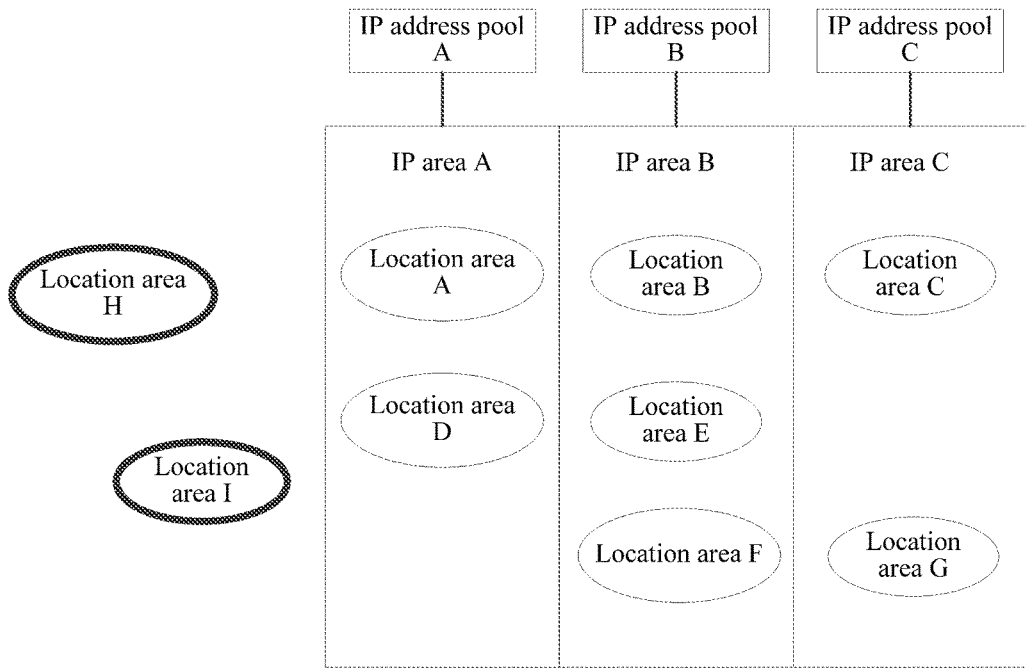
FIG. 9 is a schematic structural diagram of a correspondence, which is involved in an embodiment of the present invention, between a location area and an IP area.

As shown in FIG. 9, an IP area 1 corresponds to a location area A and a location area D; an IP area 2 corresponds to a location area B, a location area E, and a location area F; an IP area 3 corresponds to a location area C and a location area G. That is, each IP area corresponds to at least one location area, each location area can correspond to only one IP area, each IP area may be in a one-to-one correspondence with one IP address pool or one group of IP address pools (one IP address pool is used as an example for description in the figure), and IP address pools corresponding to different IP areas have no intersection set. A location area H and a location area I do not belong to any IP area. That is, some location areas may not belong to any IP area, and an IP address is still assigned according to the IP address assignment method provided in the background.

Then, correspondences between user location information and different IP address pools are saved in advance in the packet data gateway and the mobility management network element. The correspondences may have two forms:

first, a correspondence between a location area and an IP area; and second, a first correspondence between a location area and intermediate information, and a second correspondence between intermediate information and an IP address pool, where the intermediate information is an APN (Access Point Name), a Domain, or an NAI (Network Access Identifier).

It is assumed that a current location area is a location area belonging to an IP area, that is, a location area in which an IP address needs to be assigned according to the location area. Considering a mobile feature of a terminal, to ensure that the terminal uses, in different location areas, IP addresses corresponding to the location areas, this embodiment of the present invention mainly involves three scenarios:

first, the terminal is powered on and is attached in a current location area, and then an IP address is assigned according to the current location area;

second, the terminal leaves a current location area, and the terminal needs to release an established packet data connection, that is, the terminal cannot continue to use an IP address assigned in the current location area, and an IP address needs to be re-assigned in a target location area in which the terminal is located after movement; and third, the terminal enters a current location area, and the terminal needs to release an established packet data connection, that is, the terminal cannot continue to use an IP address assigned in an original location area in which the terminal is located before movement, and an IP address needs to be re-assigned in the current location area.

The three scenarios are respectively described below in detail by using three embodiments.

Figure 10:
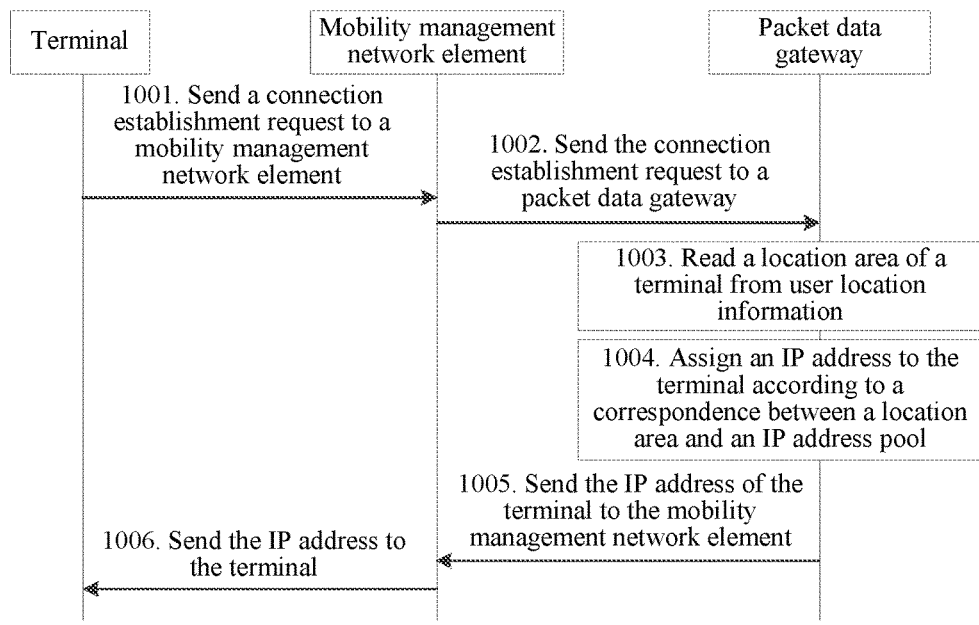
FIG. 10 is a method flowchart of an IP address assignment method according to another embodiment of the present invention.

Refer to FIG. 10, which is a method flowchart of an IP address assignment method according to another embodiment of the present invention. This embodiment mainly describes the first scenario in detail. The method includes:

Step 1001: A terminal sends a connection establishment request to a mobility management network element.

The connection establishment request is used to request to establish a packet data connection between the terminal and a packet data gateway.

The connection establishment request needs to carry ULI (User Location Information) of the terminal. The ULI identifies a location area in which the terminal is located. Specifically, this step includes:

sending, by the terminal, the connection establishment request to an access network element, adding, by the access network element, the ULI information of the terminal to the connection establishment request, and sending the connection establishment request to the mobility management network element, where the user location information may be carried in an extension field of the connection establishment request.

Correspondingly, the mobility management network element receives the connection establishment request of the terminal, where the connection establishment request carries the user location information of the terminal.

Step 1002: The mobility management network element sends the connection establishment request to a packet data gateway.

The connection establishment request sent by the terminal to the mobility management network element and the connection establishment request sent by the mobility management network element to the packet data gateway may be the same or different in form of signaling messages.

Correspondingly, the packet data gateway receives the connection establishment request.

Step 1003: The packet data gateway reads a location area of the terminal from user location information.

Step 1004: The packet data gateway assigns an address to the terminal according to a correspondence between a location area of the terminal and an IP address pool.

Because the correspondence may have two specific forms, this step includes two different implementation manners:

if the correspondence includes a correspondence between a location area and an IP area, querying the correspondence for the corresponding IP area according to the location area, and assigning the terminal one IP address from an IP address pool of the found IP area; and if the correspondence includes a first correspondence between a location area and intermediate information and a second correspondence between intermediate information and an IP area, querying the first correspondence for the corresponding intermediate information according to the location area, then querying the second correspondence for a corresponding IP area according to the found intermediate information, and assigning the terminal one IP address from an IP address pool of the found IP area, where the intermediate information is an access point name APN, a domain Domain, or a network access identifier NAI.

Step 1005: The packet data gateway sends the IP address of the terminal to the mobility management network element.

Correspondingly, the mobility management network element receives the IP address, which is sent by the packet data gateway, of the terminal.

Step 1006: The mobility management network element sends the IP address to the terminal.

Correspondingly, the terminal receives the IP address sent by the mobility management network element, where the IP address is used to establish a packet data connection between the terminal and the packet data gateway.

To sum up, according to the IP address assignment method provided in this embodiment, a mobility management network element receives a connection establishment request of a terminal, and sends the connection establishment request to a packet data gateway, and the packet data gateway assigns an IP address to the terminal according to a correspondence between user location information in the connection establishment request and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

Figure 11A:
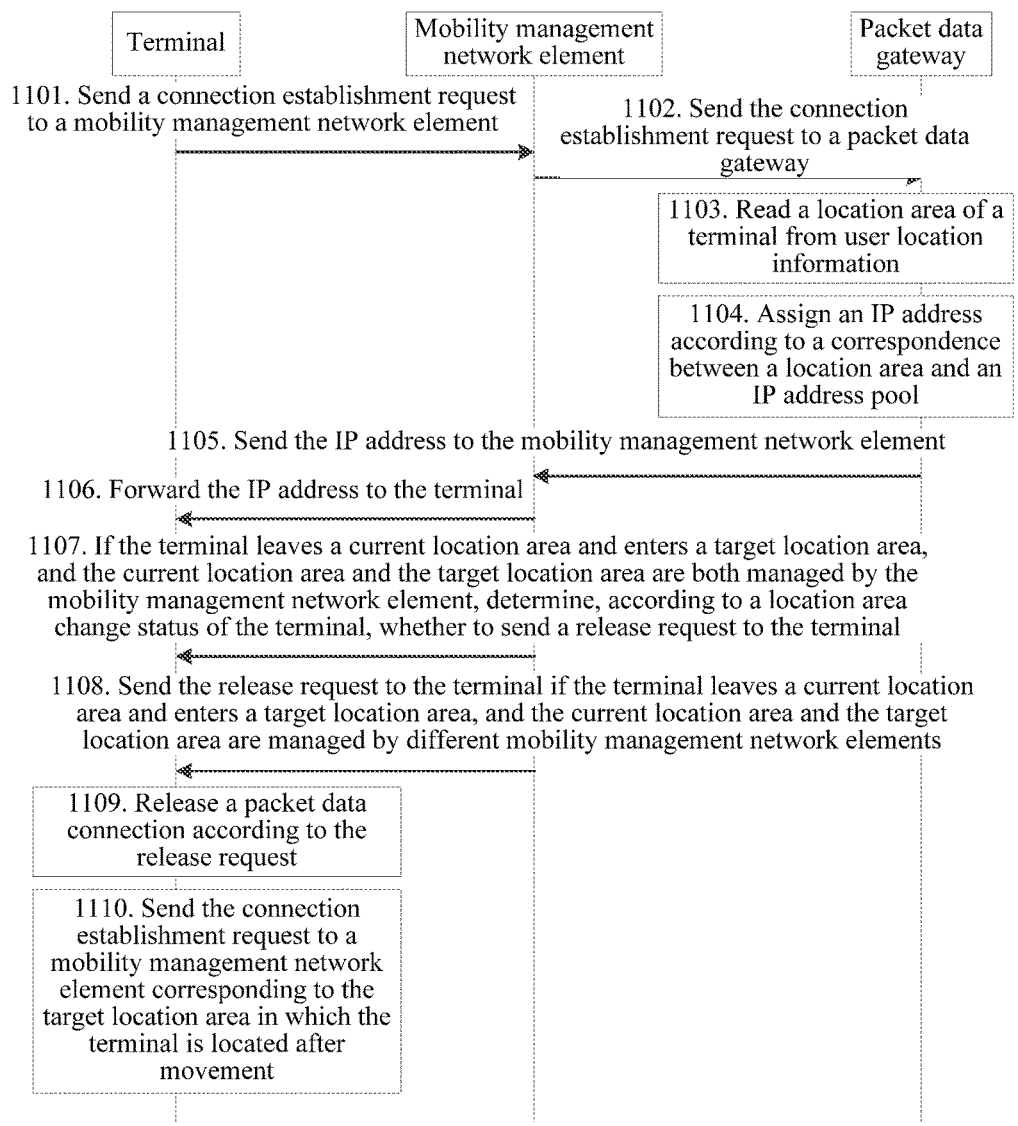
FIG. 11A is a method flowchart of an IP address assignment method according to another embodiment of the present invention.

Refer to FIG. 11A, which is a method flowchart of an IP address assignment method according to another embodiment of the present invention. This embodiment mainly describes the second scenario in detail. The method includes:

Step 1101 to step 1106 are similar to step 1001 to step 1006 that are in the embodiment shown in FIG. 10, and refer to detailed content of step 1001 to step 1006.

Step 1107: If the terminal leaves a current location area and enters a target location area, and the current location area and the target location area are both managed by the mobility management network element, determine, according to a location area change of the terminal, whether to send a release request to the terminal.

Figure 11B:
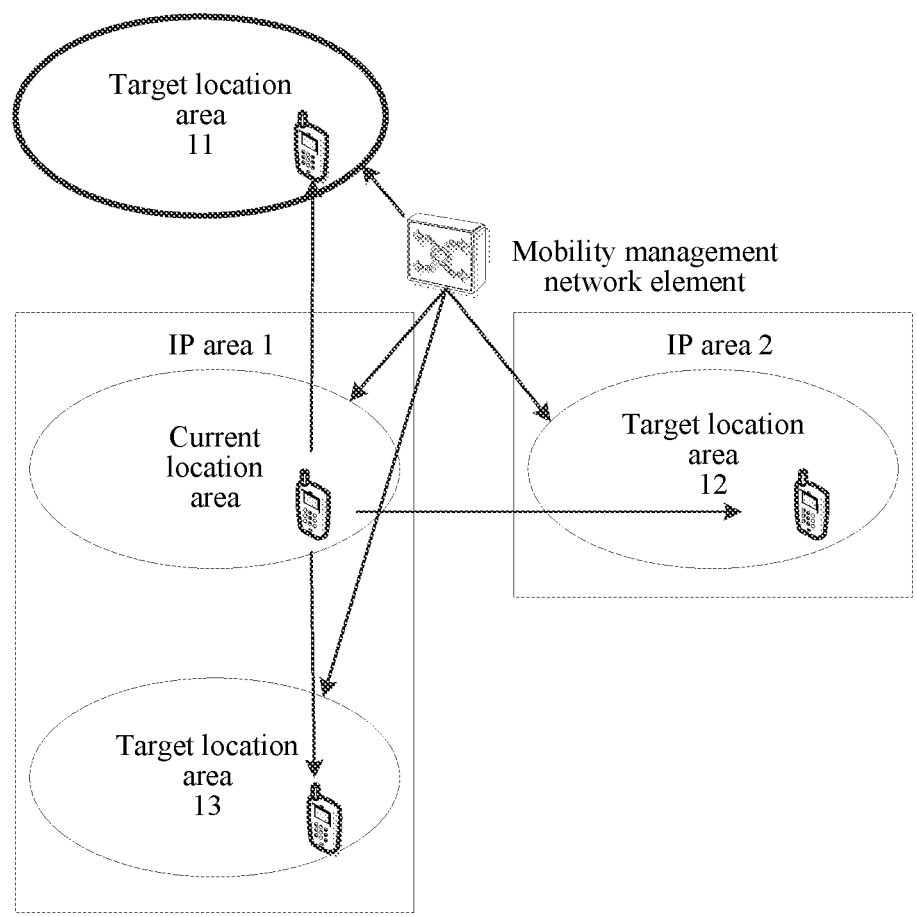
FIG. 11B and FIG. 11C are schematic diagrams of two types of scenarios in which a terminal leaves a current location area according to an embodiment shown in FIG. 11A.

The current location area is managed by the mobility management network element shown in FIG. 11A and is a location area belonging to one IP area. There are two types of sub-scenarios in which the terminal leaves the current location area:

1. The current location area and the target location area in which the terminal is located after movement are both managed by a same mobility management network element. With reference to FIG. 11B, specific sub-scenarios are as follows:

A sub-scenario 11: The terminal moves from the current location area to a target location area 11, where the target location area 11 does not belong to any IP area.

A sub-scenario 12: The terminal moves from the current location area to a target location area 12, where the target location area 12 belongs to another IP area.

A sub-scenario 13: The terminal moves from the current location area to a target location area 13, where the target location area 13 and the current location area belong to a same IP area.

Figure 11C:
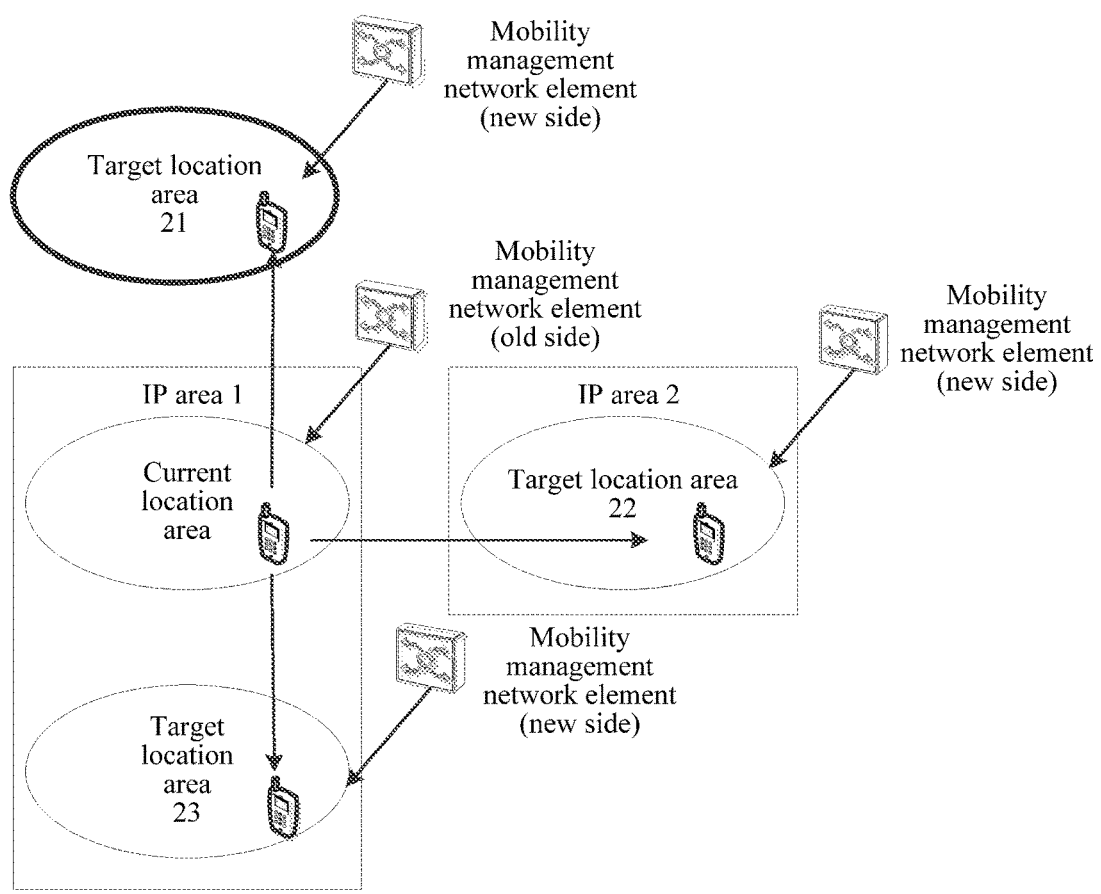

2. The current location area and the target location area in which the terminal is located after movement are managed by different mobility management network elements, and the mobility management network element shown in FIG. 11A is configured to manage the current location area. With reference to FIG. 11C, specific sub-scenarios are as follows:

A sub-scenario 21: The terminal moves from the current location area to a target location area 21, where the target location area 21 does not belong to any IP area.

A sub-scenario 22: The terminal moves from the current location area to a target location area 22, where the target location area 22 belongs to another IP area.

A sub-scenario 23: The terminal moves from the current location area to a target location area 23, where the target location area 23 and the current location area belong to a same IP area.

After the terminal moves from the current location area to the target location area, a location area update procedure of the terminal may be triggered by the terminal, or may be triggered by an access network element of the terminal. After the location area update procedure is triggered, regardless of whether the current location area and the target location area are managed by a same mobility management network element, either of the terminal and the access network element sends a location update request to a mobility management network element (a new side) corresponding to the target location area, and the mobility management network element (the new side) corresponding to the target location area then interacts with another network element to perform the location update procedure. Therefore, corresponding to the foregoing two types of sub-scenarios, this step respectively has two different implementation manners:

For the sub-scenarios shown in FIG. 11B, that is, the scenarios in which the current location area and the target location area are both managed by the same mobility management network element, this step includes:

sending, by the mobility management network element, the release request to the terminal if the current location area and the target location area are both managed by the mobility management network element, and the target location area does not correspond to any IP area;

or sending, by the mobility management network element, the release request to the terminal if the current location area and the target location area are both managed by the mobility management network element, and the target location area belongs to another IP area;

or skipping, by the mobility management network element, sending the release request to the terminal if the current location area and the target location area are both managed by the mobility management network element, and the current location area and the target location area belong to a same IP area.

If the current location area and the target location area belong to a same IP area, the mobility management network element skips sending the release request to the terminal, that is, in this sub-scenario, the terminal performs only a normal location update procedure, and does not need to re-assign an IP address or re-establish a packet data connection.

It should be noted that, in this step, the mobility management network element detects whether a location update request that corresponds to the terminal and that is aperiodically reported is received. If the location update request that corresponds to the terminal and that is aperiodically reported is received, the mobility management network element determines that the terminal leaves the current location area.

Step 1108: Send the release request to the terminal if the terminal leaves a current location area and enters a target location area, and the current location area and the target location area are managed by different mobility management network elements.

For the sub-scenarios shown in FIG. 11C, that is, the scenarios in which the current location area and the target location area are managed by different mobility management network elements, because a mobility management network element (an old side) may learn location area information of the terminal in the current location area, but cannot learn location area information of the terminal in the target location area in some scenarios, the mobility management network element always makes the following decision:

sending, by the mobility management network element (the old side), the release request to the terminal.

Correspondingly, the terminal receives the release request sent by the mobility management network element. The release request may be implemented by using existing signaling. For example, the release request may be a re-attach request, a TAU reject (Tracking Area Update reject) message, an RAU reject (Route Area Update reject) message, a detach message, or a PDP (Packet Data Protocol) deactivation request.

It should be additionally noted that, because the mobility management network element manages the current location area, and the location update request corresponding to the terminal is sent to the mobility management network element (the new side) corresponding to the target location area, the mobility management network element (the old side) detects whether a terminal information obtaining request sent by the mobility management network element (the new side) corresponding to the target location area is received, where the terminal information obtaining request is sent after the mobility management network element (the new side) corresponding to the target location area receives the location update request that corresponds to the terminal and that is aperiodically reported, and the terminal information obtaining request is used to obtain connection information of the terminal in the current location area. If the terminal information obtaining request sent by the mobility management network element (the new side) corresponding to the target location area is received, the mobility management network element (the old side) determines that the terminal leaves the current location area.

Step 1109: The terminal releases a packet data connection according to the release request.

The terminal releases the packet data connection established in step 1101 to step 1106. A release process is:

the terminal sends a connection release request to the mobility management network element, the mobility management network element sends the connection release request to a packet data gateway, and the packet data gateway releases a packet data connection to the terminal according to the connection release request.

Step 1110: The terminal sends a connection establishment request to a mobility management network element corresponding to the target location area in which the terminal is located after movement.

For the sub-scenarios shown in FIG. 11B, the terminal still sends the connection establishment request to the same mobility management network element, to re-assign an IP address and establish a packet data connection.

For the sub-scenarios shown in FIG. 11C, the terminal sends the connection establishment request to the mobility management network element corresponding to the target location area in which the terminal is located after movement, to re-assign an IP address and establish a packet data connection.

To sum up, according to the IP address assignment method provided in this embodiment, a mobility management network element receives a connection establishment request of a terminal, and sends the connection establishment request to a packet data gateway, and the packet data gateway assigns an IP address to the terminal according to user location information in the connection establishment request and an IP address pool. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

In this embodiment, when the mobility management network element detects that the terminal leaves a current location area and enters a target location area, the mobility management network element further sends a release instruction to the terminal, to instruct the terminal to release a packet data connection established in the current location area, requests again to assign an IP address, and re-establishes a packet data connection, achieving an effect that after leaving the current location area, the terminal cannot continue to use an IP address assigned in the current location area.

Figure 12A:
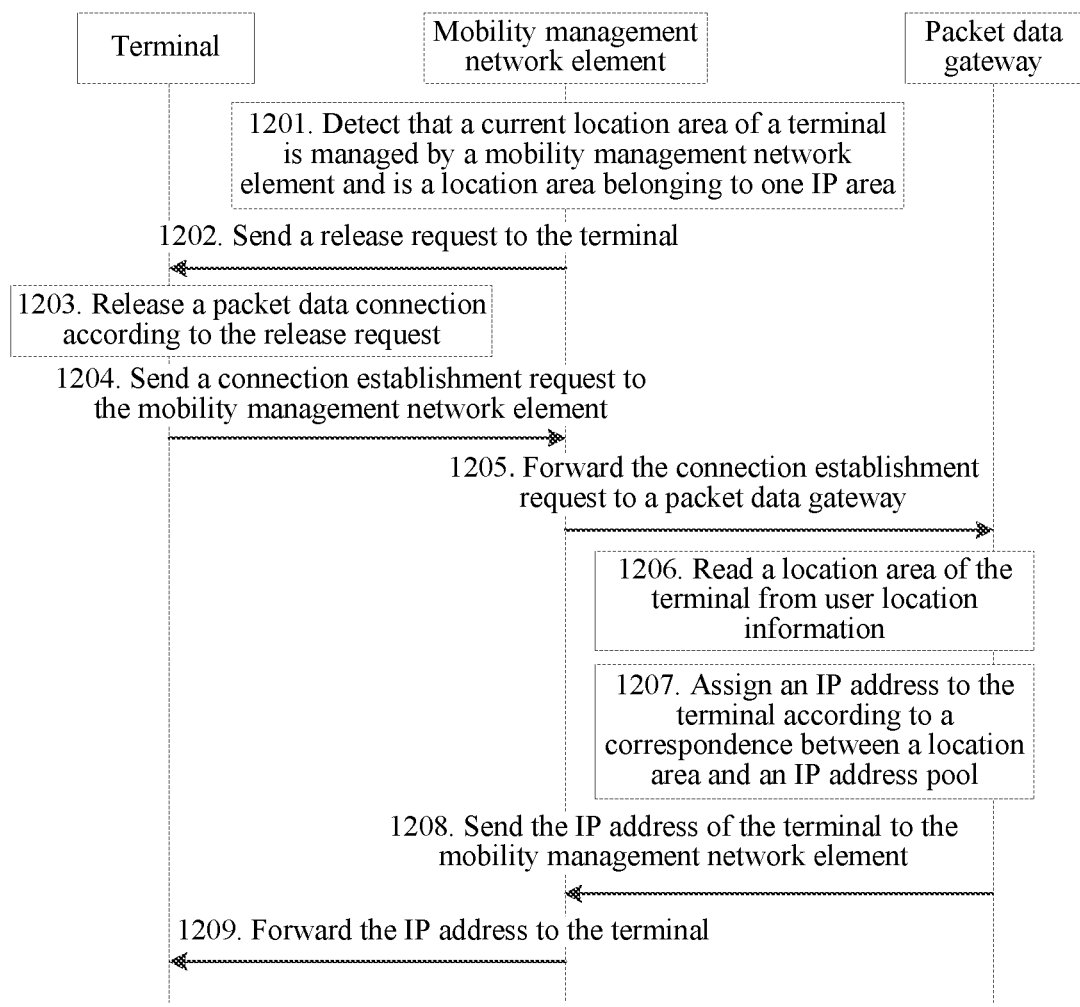
FIG. 12A is a method flowchart of an IP address assignment method according to another embodiment of the present invention.

Refer to FIG. 12A, which is a method flowchart of an IP address assignment method according to another embodiment of the present invention. This embodiment mainly describes the third scenario in detail. The method includes:

Step 1201: A mobility management network element detects that a current location area of a terminal is managed by the mobility management network element and is a location area belonging to one IP area.

After the terminal is powered on and is attached in the current location area or moves into the current location area, the mobility management network element receives an attach request or a location update request of the terminal, where the attach request or the location update request carries an identifier of the current location area. The mobility management network element detects whether the current location area of the terminal is managed by the mobility management network element and is a location area belonging to one IP area. If it is detected that the current location area of the terminal is managed by the mobility management network element and is a location area belonging to one IP area, it is considered that the terminal enters the current location area.

Figure 12B:
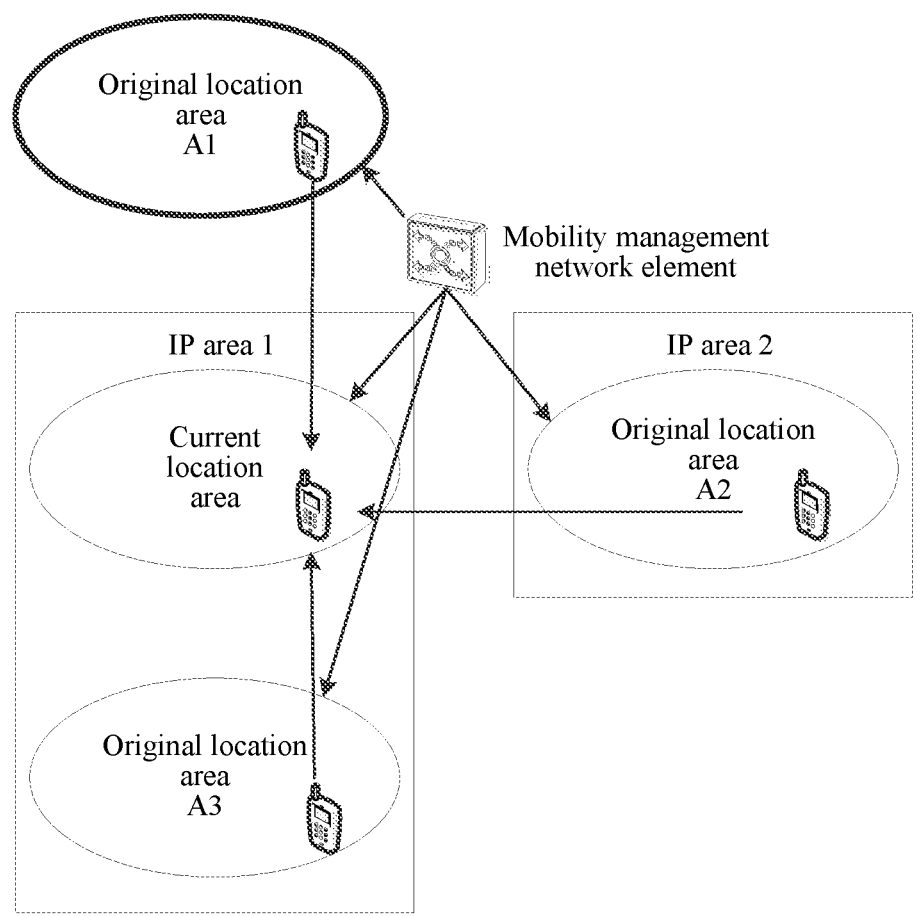
FIG. 12B and FIG. 12C are schematic diagrams of two types of scenarios in which a terminal enters a current location area according to an embodiment shown in FIG. 12A.

In addition to that the terminal is powered on and is attached, there are also two types of sub-scenarios in which the terminal moves from an original location area to the current location area:

A. The original location area in which the terminal is located before movement and the current location area are both managed by a same mobility management network element. With reference to FIG. 12B, specific sub-scenarios are as follows:

A sub-scenario A1: The terminal moves from an original location area A1 to the current location area, where the original location area A1 does not belong to any IP area.

A sub-scenario A2: The terminal moves from an original location area A2 to the current location area, where the original location area A2 belongs to another IP area.

A sub-scenario A3: The terminal moves from an original location area A3 to the current location area, where the original location area A3 and the current location area belong to a same IP area.

Figure 12C:
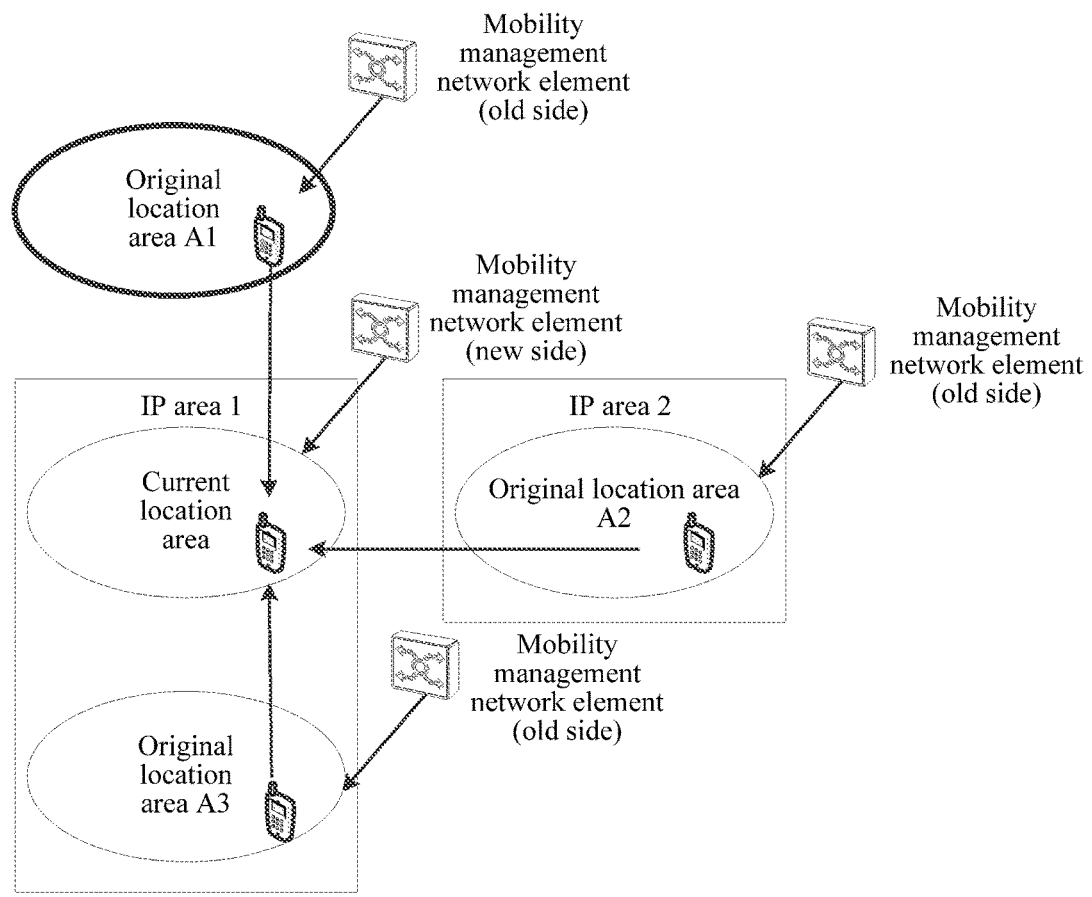

B. The original location area in which the terminal is located before movement and the current location area are managed by different mobility management network elements, and the mobility management network element shown in FIG. 12A is configured to manage the current location area. With reference to FIG. 12C, specific sub-scenarios are as follows:

A sub-scenario B1: The terminal moves from an original location area B1 to the current location area, where the original location area B1 does not belong to any IP area.

A sub-scenario B2: The terminal moves from an original location area B2 to the current location area, where the original location area B2 belongs to another IP area.

A sub-scenario B3: The terminal moves from an original location area B3 to the current location area, where the original location area B3 and the current location area belong to a same IP area.

Step 1202: The mobility management network element sends a release request to the terminal.

However, because the mobility management network element may learn location area information of the terminal in the current location area, but cannot learn location area information of the terminal in the original location area in some scenarios, in this embodiment, regardless of which scenario the location of the terminal is in, the mobility management network element always makes the following decision:

sending the release request to the terminal.

The release request may be implemented by using existing signaling. For example, the release request may be a re-attach request, a TAU reject (Tracking Area Update reject) message, an RAU reject (Route Area Update reject) message, a detach message, or a PDP (Packet Data Protocol) deactivation request.

In a possible implementation manner, if the mobility management network element can obtain the location area information of the terminal in the original location area, this step optionally includes:

if the original location area and the current location area belong to a same IP area, skipping, by the mobility management network element, sending the release request to the terminal.

Step 1203: The terminal releases an original packet data connection according to the release request.

The terminal releases the packet data connection established in the original location area. A release process is:

the terminal sends a connection release request to a mobility management network element corresponding to the original location area, the mobility management network element sends the connection release request to a packet data gateway, and the packet data gateway releases a packet data connection to the terminal according to the connection release request.

Step 1204: The terminal sends a connection establishment request to the mobility management network element corresponding to the current location area.

Step 1205 to step 1210 are similar to step 1001 to step 1006 that are in the embodiment shown in FIG. 10, and refer to detailed content of step 1001 to step 1006.

In a special case, if the terminal, as an international roaming subscriber, enters the current location area, the mobility management network element may forbid the terminal to establish a packet data connection.

To sum up, according to the IP address assignment method provided in this embodiment, a mobility management network element receives a connection establishment request of a terminal, and sends the connection establishment request to a packet data gateway, and the packet data gateway assigns an IP address to the terminal according to a correspondence between user location information in the connection establishment request and an IP address. In this way, a problem in the background that when a packet data gateway randomly assigns an IP address to UE, an Internet operator cannot identify another characteristic of the UE according to the IP address of the UE is resolved, and effects that the packet data gateway can assign an IP address according to a location of a terminal, and different IP addresses are assigned at different regions are achieved.

In this embodiment, when detecting that the terminal enters a current location area, the mobility management network element further sends a release instruction to the terminal, to instruct the terminal to release a packet data connection established in an original location area, requests again to assign an IP address and re-establishes a packet data connection, achieving an effect that after moving from an original location area that does not belong to any IP area to a current location area, a terminal triggers the packet data gateway to assign an IP address to the terminal according to the current location area.

It should be additionally noted that, in the embodiments shown in FIG. 10, FIG. 11A, and FIG. 12A, steps related to one side of the terminal may be independently implemented as an IP address assignment method on one side of the terminal; steps related to one side of the mobility management network element may be independently implemented as an IP address assignment method on one side of the mobility management network element; steps related to one side of the packet data gateway may be independently implemented as an IP address assignment method on one side of the packet data gateway.

It should be further additionally noted that, the foregoing function of assigning an IP address according to a location area may be set to an independent function. When the function is enabled, the packet data gateway assigns an IP address according to a location area; when the function is disabled, the packet data gateway assigns an IP address according to the method provided in the background.

In addition, the IP address assignment method provided in FIG. 10, FIG. 11A, and FIG. 12A may be applied to different communications systems, such as 2G, 3G, CDMA (Code Division Multiple Access), and LTE (Long Term Evolution), which is not specifically limited in this embodiment of the present invention.

Figure 13:
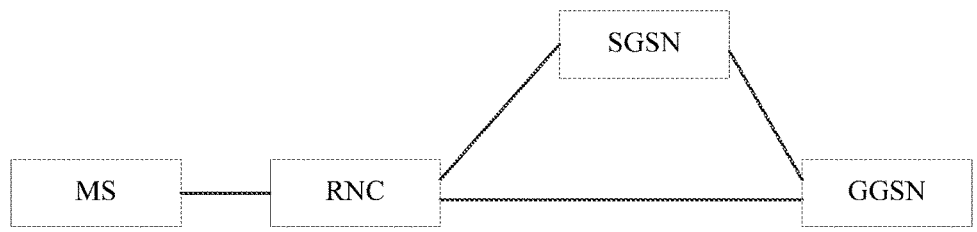
FIG. 13 is a schematic structural diagram of an implementation environment involved in an IP address assignment method according to an embodiment of the present invention.

Refer to FIG. 13, which is a schematic structural diagram of an implementation environment involved in an IP address assignment method according to an embodiment of the present invention. The implementation environment is a 2G/3G communications system. The 2G/3G communications system includes an MS (Mobile Station), a RAN (Radio Access Network), an SGSN, and a GGSN, where the MS is used as the terminal in the embodiments shown in FIG. 10, FIG. 11A, and FIG. 12A;

the RAN is used as the access network element in the embodiments shown in FIG. 10, FIG. 11A, and FIG. 12A;

the SGSN is used as the mobility management network element in the embodiments shown in FIG. 10, FIG. 11A, and FIG. 12A; and the GGSN is used as the packet data gateway in the embodiments shown in FIG. 10, FIG. 11A, and FIG. 12A.

In this communications system, a packet data connection is a PDP connection, a connection establishment request may be a PDP activation request, and a connection release request may be a PDP release request.

Figure 14:
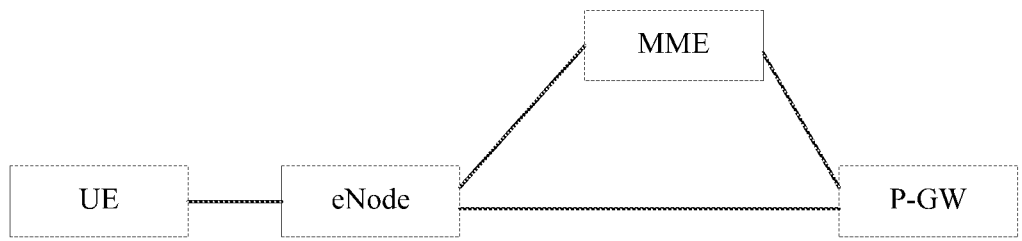
FIG. 14 is a schematic structural diagram of another implementation environment involved in an IP address assignment method according to an embodiment of the present invention.

Refer to FIG. 14, which is a schematic structural diagram of another implementation environment involved in an IP address assignment method according to an embodiment of the present invention. The implementation environment is an LTE communications system. The LTE communications system includes UE, an eNode, an MME, and a P-GW, where the UE is used as the terminal in the embodiments shown in FIG. 10, FIG. 11A, and FIG. 12A;

the eNode is used as the access network element in the embodiments shown in FIG. 10, FIG. 11A, and FIG. 12A;

the MME is used as the mobility management network element in the embodiments shown in FIG. 10, FIG. 11A, and FIG. 12A; and the P-GW is used as the packet data gateway in the embodiments shown in FIG. 10, FIG. 11A, and FIG. 12A.

In this communications system, a packet data connection is a PDN connection, a connection establishment request may be a PDN activation request, and a connection release request may be a PDN release request, or a connection release request may be further a detach request (a final PDN connection).

Figure 15:
FIG. 15 is a schematic structural diagram of another implementation environment involved in an IP address assignment method according to an embodiment of the present invention.

Refer to FIG. 15, which is a schematic structural diagram of another implementation environment involved in an IP address assignment method according to an embodiment of the present invention. The implementation environment is a CDMA communications system. The CDMA communications system includes an MS, a PCF (packet control function), and a PDSN (Packet Data Serving Node), where the MS is used as the terminal in the embodiments shown in FIG. 10, FIG. 11A, and FIG. 12A;

the PCF is used as the access network element in the embodiments shown in FIG. 10, FIG. 11A, and FIG. 12A; and the PDSN not only is used as the mobility management network element in the embodiments shown in FIG. 10, FIG. 11A, and FIG. 12A, but also is used as the packet data gateway in the embodiments shown in FIG. 10, FIG. 11A, and FIG. 12A. In this case, some steps between the mobility management network element and the packet data gateway may be omitted, or are implemented by means of transmission of internal information of the PDSN.

In this communications system, a packet data connection is a PPP (Point-to-Point Protocol) connection, a connection establishment request may be a PPP activation request, and a connection release request may be a PPP release request.

Figure 16:
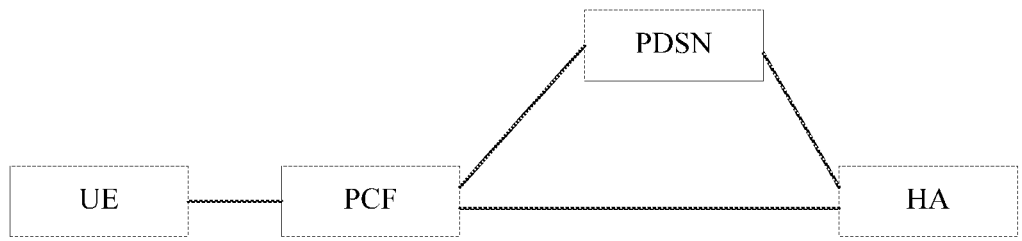
FIG. 16 is a schematic structural diagram of another implementation environment involved in an IP address assignment method according to an embodiment of the present invention.

Refer to FIG. 16, which is a schematic structural diagram of another implementation environment involved in an IP address assignment method according to an embodiment of the present invention. The implementation environment is a CDMA communications system. The CDMA communications system includes an MS, a PCF, a PDSN, and an HA (Home Agent), where the MS is used as the terminal in the embodiments shown in FIG. 10, FIG. 11A, and FIG. 12A;

the PCF is used as the access network element in the embodiments shown in FIG. 10, FIG. 11A, and FIG. 12A;

the PDSN is used as the mobility management network element in the embodiments shown in FIG. 10, FIG. 11A, and FIG. 12A; and the HA is used as the packet data gateway in the embodiments shown in FIG. 10, FIG. 11A, and FIG. 12A.

In this communications system, a packet data connection is a PPP connection, a connection establishment request may be a PPP activation request, and a connection release request may be a PPP release request.

Figure 17:
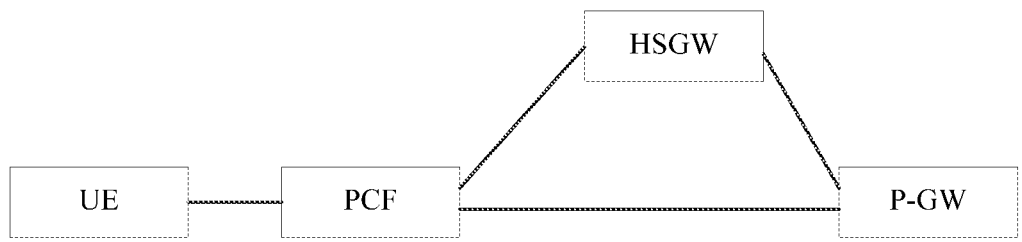
FIG. 17 is a schematic structural diagram of another implementation environment involved in an IP address assignment method according to an embodiment of the present invention.

Refer to FIG. 17, which is a schematic structural diagram of another implementation environment involved in an IP address assignment method according to an embodiment of the present invention. The implementation environment is a CDMA communications system. The CDMA communications system includes an MS, a PCF, an HSGW (Higher Speed Gateway), and a PGW, where the MS is used as the terminal in the embodiments shown in FIG. 10, FIG. 11A, and FIG. 12A;

the PCF is used as the access network element in the embodiments shown in FIG. 10, FIG. 11A, and FIG. 12A;

the HSGW is used as the mobility management network element in the embodiments shown in FIG. 10, FIG. 11A, and FIG. 12A; and the P-GW is used as the packet data gateway in the embodiments shown in FIG. 10, FIG. 11A, and FIG. 12A.

In this communications system, a packet data connection is a PDN connection, a connection establishment request may be a VSNCP (Vendor-specific Network Control Protocol) configuration request, and a connection release request may be a VSNCP termination request.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A mobility management network element, comprising: a processor, and a memory, a receiver, and a transmitter that are electrically connected to the processor, wherein the receiver is configured to receive a connection establishment request of a terminal, wherein the connection establishment request carries user location information of the terminal;

the processor is configured to control the transmitter to send the connection establishment request to a packet data gateway;

the receiver is configured to receive an IP address of the terminal that is fed back by the packet data gateway, wherein the IP address is assigned by the packet data gateway to the terminal according to a correspondence between the user location information and an IP address pool; and the processor is further configured to control the transmitter to send the IP address to the terminal, wherein the processor is further configured to:

determine, according to a location area change of the terminal, whether to control the transmitter to send a release request to the terminal if the terminal leaves a current location area and enters a target location area;

control the transmitter to send the release request to the terminal if the current location area and the target location area are both managed by the mobility management network element, and the target location area does not correspond to any IP area;

control the transmitter to send the release request to the terminal if the current location area and the target location area are both managed by the mobility management network element, and the target location area belongs to another IP area;

skip sending the release request to the terminal if the current location area and the target location area are both managed by the mobility management network element, and the current location area and the target location area belong to a same IP area; and
wherein each IP area corresponds to one or more than one IP address pool.

2. The network element according to claim 1, wherein the packet data gateway learns a corresponding IP area according to the user location information, and the IP address is obtained from an IP address pool corresponding to the IP area.

3. A mobility management network element, comprising: a processor, and
a memory, a receiver, and a transmitter that are electrically connected to the processor, wherein the receiver is configured to receive a connection establishment request of a terminal, wherein the connection establishment request carries user location information of the terminal;
the processor is configured to control the transmitter to send the connection establishment request to a packet data gateway;
the receiver is configured to receive an IP address of the terminal that is fed back by the packet data gateway, wherein the IP address is assigned by the packet data gateway to the terminal according to a correspondence between the user location information and an IP address pool; and
the processor is further configured to control the transmitter to send the IP address to the terminal, wherein the processor is further configured to: if the terminal leaves a current location area and enters a target location area, and the current location area and the target location area in which the terminal is located after movement are managed by different mobility management network elements, control the transmitter to send a release request to the terminal to release an established connection.

4. A mobility management network element, comprising: a processor, and a memory, a receiver, and a transmitter that are electrically connected to the processor, wherein the receiver is configured to receive a connection establishment request of a terminal, wherein the connection establishment request carries user location information of the terminal;
the processor is configured to control the transmitter to send the connection establishment request to a packet data gateway;
the receiver is configured to receive an IP address of the terminal that is fed back by the packet data gateway, wherein the IP address is assigned by the packet data gateway to the terminal according to a correspondence between the user location information and an IP address pool; and
the processor is further configured to control the transmitter to send the IP address to the terminal, wherein the processor is further configured to detect that a current location area of the terminal is managed by the mobility management network element and belongs to one IP area; and
the processor is further configured to control the transmitter to send a release request to the terminal to release an established connection when the current location area does not belong to the one IP area.

5. A packet data gateway, wherein the gateway comprises: a processor, and a memory, a receiver, and a transmitter that are electrically connected to the processor, wherein the receiver is configured to receive a connection establishment request that is sent by a mobility management network element and that carries user location information, wherein the connection establishment request is sent after the mobility management network element receives a connection establishment request of a terminal;
the processor is configured to assign an IP address to the terminal according to a correspondence, which is stored in the memory, between the user location information and an IP address pool; and
the processor is further configured to control the transmitter to feed back the IP address of the terminal to the mobility management network element, wherein
the processor is further configured to read a location area of the terminal from the user location information;
the processor is further configured to: if the correspondence comprises a correspondence between a location area and an IP area, query the correspondence for the corresponding IP area according to the location area, and assign the terminal one IP address from an IP address pool of the found IP area; and
the processor is further configured to: if the correspondence comprises a first correspondence between a location area and intermediate information and a second correspondence between intermediate information and an IP area, query the first correspondence for the corresponding intermediate information according to the location area, then query the second correspondence for a corresponding IP area according to the found intermediate information, and assign the terminal one IP address from an IP address pool of the found IP area, wherein the intermediate information is an access point name APN, a domain Domain, or a network access identifier NAI.

6. An IP address assignment method, wherein the method is used in a mobility management network element, and comprises:
receiving a connection establishment request of a terminal, wherein the connection establishment request carries user location information of the terminal;
sending the connection establishment request to a packet data gateway;
receiving an IP address of the terminal that is fed back by the packet data gateway,
wherein the IP address is assigned by the packet data gateway to the terminal according to a correspondence between the user location information and an IP address pool; and
sending the IP address to the terminal,
after the sending the IP address to the terminal, further comprising:
determining, according to a location area change of the terminal, whether to send a release request to the terminal if the terminal leaves a current location area and enters a target location area,
wherein the determining, according to a location area change of the terminal, whether to send a release request to the terminal comprises:
sending the release request to the terminal if the current location area and the target location area are both managed by the mobility management network element, and the target location area does not correspond to any IP area;
sending the release request to the terminal if the current location area and the target location area are both managed by the mobility management network element, and the target location area belongs to another IP area;
skipping sending the release request to the terminal if the current location area and the target location area are both managed by the mobility management network element, and the current location area and the target location area belong to a same IP area; and wherein each IP area corresponds to one or more than one IP address pool.

7. The method according to claim 6, wherein that the IP address is assigned by the packet data gateway to the terminal according to a correspondence between the user location information and an IP address pool comprises:

the packet data gateway learns a corresponding IP area according to the user location information, and the IP address is obtained from an IP address pool corresponding to the IP area.

8. An IP address assignment method, wherein the method is used in a mobility management network element comprising a processor, a receiver, and a transmitter, and comprises:

receiving, by the receiver, a connection establishment request of a terminal, wherein the connection establishment request carries user location information of the terminal;

sending, by the transmitter, the connection establishment request to a packet data gateway;

receiving, by the receiver, an IP address of the terminal that is fed back by the packet data gateway, wherein the IP address is assigned by the packet data gateway to the terminal according to a correspondence between the user location information and an IP address pool; and sending, by the transmitter, the IP address to the terminal, after the sending the IP address to the terminal, further comprising:

sending, by the transmitter, a release request to the terminal to release an established connection if the terminal leaves a current location area and enters a target location area, and the current location area and the target location area in which the terminal is located after movement are managed by different mobility management network elements.

9. An IP address assignment method, wherein the method is used in a mobility management network element comprising a processor, a receiver, and a transmitter, and comprises:

receiving, by the receiver, a connection establishment request of a terminal, wherein the connection establishment request carries user location information of the terminal;

sending, by the transmitter, the connection establishment request to a packet data gateway;

receiving, by the receiver, an IP address of the terminal that is fed back by the packet data gateway, wherein the IP address is assigned by the packet data gateway to the terminal according to a correspondence between the user location information and an IP address pool; and sending, by the transmitter, the IP address to the terminal;

detecting, by the processor, that a current location area of the terminal is managed by the mobility management network element and the current location area belongs to one IP area; and sending, by the transmitter, a release request to the terminal to release an established connection when the current location area does not belong to the one IP area.

10. An IP address assignment method, wherein the method is used in a packet data gateway, and comprises:

receiving a connection establishment request that is sent by a mobility management network element and that carries user location information, wherein the connection establishment request is sent after the mobility management network element receives a connection establishment request of a terminal;

assigning an IP address to the terminal according to a correspondence between the user location information and an IP address pool; and feeding back the IP address to the mobility management network element, wherein the assigning an IP address to the terminal according to a correspondence between the user location information and an IP address pool comprises:

reading a location area of the terminal from the user location information;

if the correspondence comprises a correspondence between a location area and an IP area, querying the correspondence for the corresponding IP area according to the location area, and assigning the terminal one IP address from an IP address pool of the found IP area; and if the correspondence comprises a first correspondence between a location area and intermediate information and a second correspondence between intermediate information and an IP area, querying the first correspondence for the corresponding intermediate information according to the location area, then querying the second correspondence for a corresponding IP area according to the found intermediate information, and assigning the terminal one IP address from an IP address pool of the found IP area, wherein the intermediate information is an access point name APN, a domain Domain, or a network access identifier NAI.

\* \* \* \* \*